s010545926B1

(12) United States Patent
Davenport et al.

(10) Patent No.: US 10,545,926 B1
(45) Date of Patent: Jan. 28, 2020

(54) COMPUTER DATA FILE SYSTEM WITH CONSISTENCY GROUPS AS BASIC FILE SYSTEM OBJECTS

(71) Applicant: EMC IP Holding Company LLC, Hopkinton, MA (US)

(72) Inventors: William C. Davenport, San Diego, CA (US); Himabindu Tummala, South Grafton, MA (US); Li Wan, North Attleboro, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 240 days.

(21) Appl. No.: 15/396,630

(22) Filed: Dec. 31, 2016

(51) Int. Cl.
G06F 16/185 (2019.01)
G06F 16/13 (2019.01)
G06F 16/18 (2019.01)
G06F 16/22 (2019.01)

(52) U.S. Cl.
CPC ............ *G06F 16/185* (2019.01); *G06F 16/13* (2019.01); *G06F 16/1873* (2019.01); *G06F 16/2246* (2019.01)

(58) Field of Classification Search
CPC ......... G06F 17/30327; G06F 17/30221; G06F 17/30091; G06F 16/185; G06F 16/1873; G06F 16/13; G06F 16/2246
See application file for complete search history.

(56) References Cited

U.S. PATENT DOCUMENTS

| 5,187,790 | A | * | 2/1993 | East | G06F 9/468 |
| | | | | | 718/107 |
| 6,301,582 | B1 | * | 10/2001 | Johnson | G06F 9/4493 |
| 7,752,180 | B1 | | 7/2010 | Fair et al. | |
| 8,166,257 | B1 | * | 4/2012 | Holl, II | G06F 13/28 |
| | | | | | 711/114 |
| 8,706,701 | B1 | * | 4/2014 | Stefanov | G06F 17/30197 |
| | | | | | 707/687 |
| 8,996,490 | B1 | * | 3/2015 | Armangau | G06Q 30/02 |
| | | | | | 707/705 |
| 9,069,708 | B2 | * | 6/2015 | Gill | G06F 11/1446 |
| 9,135,120 | B1 | | 9/2015 | Natanzon | |
| 2002/0056019 | A1 | * | 5/2002 | Kolodner | G06F 9/5016 |
| | | | | | 711/6 |
| 2004/0236761 | A1 | * | 11/2004 | Both | G06F 16/137 |
| 2007/0136389 | A1 | * | 6/2007 | Bergant | G06F 11/1435 |

(Continued)

OTHER PUBLICATIONS

Adya et al., "FARSITE: Federated, Available, and Reliable Storage for an Incompletely Trusted Environment", OSDI 2002.

*Primary Examiner* — James Trujillo
*Assistant Examiner* — Michal Bogacki
(74) *Attorney, Agent, or Firm* — BainwoodHuang

(57) ABSTRACT

A computer has a secondary storage device with a filesystem for persistent storage of application data, the filesystem having filesystem objects including files, directories, and group objects such as consistency groups. The group objects specify respective groups of the filesystem objects on which certain filesystem group operations act as a unit. The filesystem also has filesystem routines for performing filesystem operations including single-object operations and group operations. A single-object operation acts upon a specified user file or directory independently (e.g., opening or reading from a file), while a group operation acts upon a respective set of filesystem objects grouped together by a specified group object.

19 Claims, 5 Drawing Sheets

(56) References Cited

U.S. PATENT DOCUMENTS

| | | | | |
|---|---|---|---|---|
| 2011/0041006 A1* | 2/2011 | Fowler | ................... | G06F 9/466 |
| | | | | 714/10 |
| 2016/0048428 A1* | 2/2016 | Kanteti | ............... | G06F 11/1471 |
| | | | | 707/646 |
| 2016/0092256 A1* | 3/2016 | Jayachandran | ..... | G06F 9/45558 |
| | | | | 718/1 |
| 2016/0306840 A1* | 10/2016 | Deshmukh | ........ | G06F 17/30368 |
| 2016/0366016 A1* | 12/2016 | Cors | ................... | H04L 41/0806 |
| 2017/0315877 A1* | 11/2017 | Kaplingat | ........... | G06F 11/1458 |

\* cited by examiner

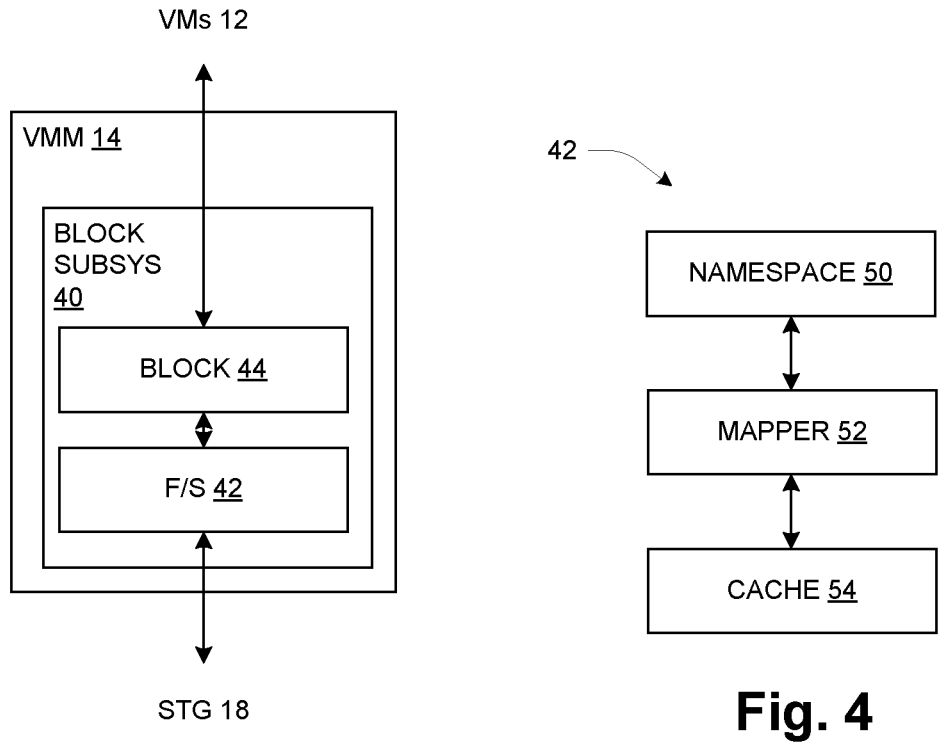
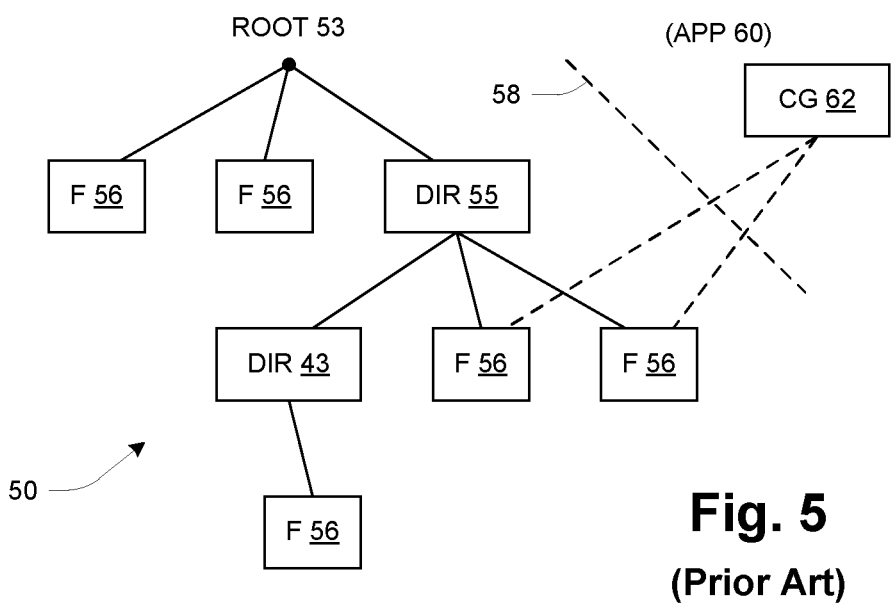
Fig. 5 (Prior Art)

COMPUTER DATA FILE SYSTEM WITH CONSISTENCY GROUPS AS BASIC FILE SYSTEM OBJECTS

BACKGROUND

The present invention is related to computer filesystems, in particular to filesystems used in applications such as data storage systems.

SUMMARY

Data storage systems have used internal filesystems for managing storage objects that are internally represented as files of a filesystem. Filesystems include both organizational as well as functional features that are useful in providing data storage services.

Data storage systems have also employed additional structures and functionality including consistency groups, which are collections of storage objects that are treated as a single unit for certain operations. Examples are given herein. In known uses, consistency groups are implemented outside of an underlying filesystem, because the filesystem has no representation of consistency groups nor operations on consistency groups. This need to implement consistency groups outside the file system generally adds increased complexity in the orchestration and persistence of both the consistency groups and snapsets, including coordination between the underlying filesystem and the layer implementing the consistency group and snapset.

The present disclosure is directed to a computer file system having consistency groups as a-basic filesystem objects, i.e., with support for consistency groups built directly into a filesystem as native object types. This approach improves efficiency and simplicity. In one example, a consistency group object can support snapshot requests by transactionally suspending IO to the objects in the consistency group and creating a snapset object containing a single point in time snapshot of all of the objects of the consistency group. This operation can be carried out by the file system without special programming of an overlying application, such as a data storage application.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 3 is a block diagram of a virtual machine monitor;

FIG. 4 is a block diagram of a filesystem;

FIG. 5 is a schematic depiction of a file system and consistency group as known in the art;

DETAILED DESCRIPTION

Figure 1:
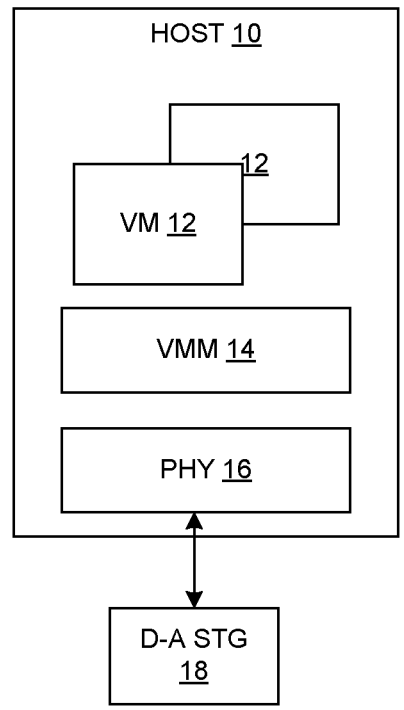
FIG. 1 is a block diagram of a computer from a functional perspective.

FIG. 1 shows a computer identified as a host 10, referring to its function of hosting of virtual machines (VMs) 12 (commonly referred to as "guest machines"). The host 10 executes a virtual machine monitor (VMM) 14 which may be a hypervisor for example. The host 10 includes physical (PHY) resources as indicated at 16, typically including processors, memory, network interfaces, etc. Additional physical resources available to the host 10 include secondary storage as direct-attached storage (D-A STG) 18, i.e., physical storage devices connected by a system bus and directly managed by the VMM 14.

The VMM 14 and VMs 12 are software images executed using the physical resources 16. In operation, the VMM 14 provides virtualized storage resources to the VMs 12, and uses the storage 18 as the underlying real storage. In connection with these operations the VMM 14 utilizes a filesystem with associated structure and functionality as described below.

Figure 2:
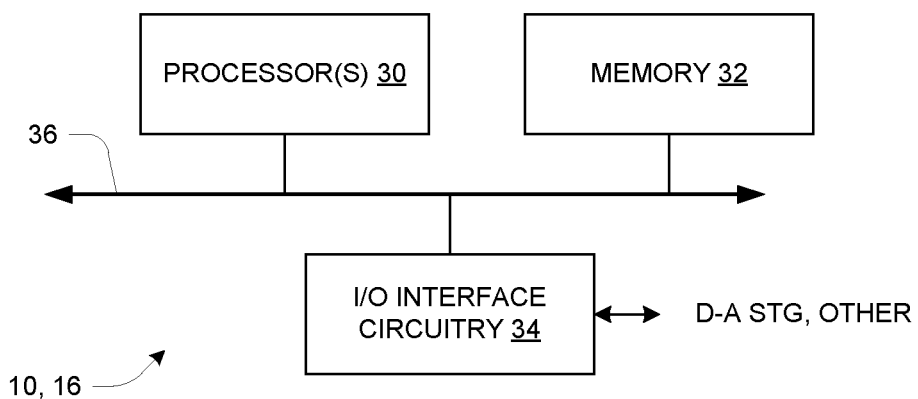
FIG. 2 is a block diagram of a computer from a hardware perspective.

FIG. 2 shows an example configuration of a physical computer, such as host 10, from a computer hardware perspective. The physical components 16 include one or more processors 30, memory 32, and interface circuitry 34 interconnected by data interconnections 36 such as one or more high-speed data buses. The interface circuitry 32 provides a hardware connection to direct-attached storage (FIG. 1) and perhaps other external devices/connections. The processor(s) 30 with connected memory 32 may also be referred to as "processing circuitry" herein. In operation, the memory 32 stores data and instructions of system software (e.g., VMM 14) and one or more application programs (e.g., VMs 12) which are executed by the processor(s) 30 to cause the hardware to function in a software-defined manner. Thus the computer hardware executing instructions of a filesystem, such as described below, can be referred to as a filesystem component, and it will be understood that a collection of such software-implemented components can all be realized and interact with each other as one or more sets of computer processing hardware executing different computer programs as generally known in the art.

FIG. 3 shows the VMM 14 as including a block subsystem 40 that includes a filesystem (F/S) 42 and block components 44. The block subsystem 40 is responsible for providing block-oriented storage resources (e.g., logical volumes, etc.) to the VMs 12 using the direct-attached storage 18. The block components 44 define and operate upon logical storage objects which are stored as files in the filesystem 42. The filesystem 42 provides basic operations such as reading and writing, as well as higher-level operations including snapshotting, deduplication, etc. Snapshotting refers to creation and use of point-in-time copies called "snapshots" or "snaps", and is one focus of the present description. Those skilled in the art will appreciate that the disclosed techniques may be used in connection with other storage services, such as replication for example.

FIG. 4 shows certain structure of the filesystem 42. It includes components at three functional layers, namely a namespace (NS) layer 50, a mapper layer 52, and a cache layer 54. The namespace 50 performs higher-level functions such as managing objects, directories, etc., treating them as single logical extents. The mapper layer 52 performs more detailed underlying operations including maintaining an indirect-block (IB) tree of inodes (F/S metadata) identifying the underlying storage blocks for the filesystem objects. The cache layer 54 is a transaction layer which enables the namespace 50 to start transactions and have them completed automatically, and to buffer intermediate results so that either an entire transaction is committed or it can be aborted.

FIG. 5 depicts certain aspects of filesystems as generally known. It shows a tree-graph representation of a filesystem 50, which begins at a root 53 and extends through potentially many hierarchical layers as established by directory files or "directories" (DIR) 55. Generally, application files 56 are stored within each directory 55. A line 58 is used to indicate a separation of the filesystem 50 from an application 60 or other user of the filesystem 50. In particular, the application 60 employs an additional organization of the files 56, referred to as a consistency group or CG 62. Generally, a CG 62 is used when an application 60 requires that sets of files 56 (or other resources, more generally) be treated as a single group by certain operations, so that an operation either completes for all group members or does not complete for any group member. One example of a type of application 60 using consistency groups 62 is a database. There are many uses for consistency groups in a storage context, such as cloning or replication, rebuilding, migration, etc. One particular use is restoring sets of disks across multiple VMs 12, where each VM 12 must see the same restored image. These may be referred to as "crash-consistent" CGs.

FIG. 5 shows that the use of consistency groups 62 has been an application-level function applied on top of regular file-system structure and operations. While this arrangement can work, it generally includes certain inefficiencies. For example, in many respects a consistency group 62 may be similar to a directory 55. They both serve to group objects such as files 56 and organize them into larger structures, and they may include similar filesystem routines such as adding/removing, enumerating members, etc. In the known arrangement of FIG. 4, each application 60 must implement all of the functionality for the consistency groups 62, leading to inefficiencies in both design/implementation as well as runtime performance. In another aspect, the arrangement of FIG. 5 requires potentially more disruptive (and thus inefficient) action, such as completely suspending filesystem I/O while performing an operation on a consistency group.

In some applications it may be desirable to leverage directory logic (of a filesystem) for organization and operations (such as enumeration) if possible. For this and other reasons, a filesystem as disclosed herein includes consistency groups as native internal objects, similar to files and directories. In some embodiments, a consistency group may be layered on top of a directory object, i.e., it is a super-type of directory that incorporates functionality of underlying directory objects. In other embodiments, a consistency group may be a distinct object having its own structure and functionality, some of which may resemble (but not rely upon) corresponding structure and functionality of directory objects. In the storage context in particular, a consistency group may directly support snapshots or "snaps", as described more below, which is a type of functionality not previously incorporated into filesystems.

Figure 6:
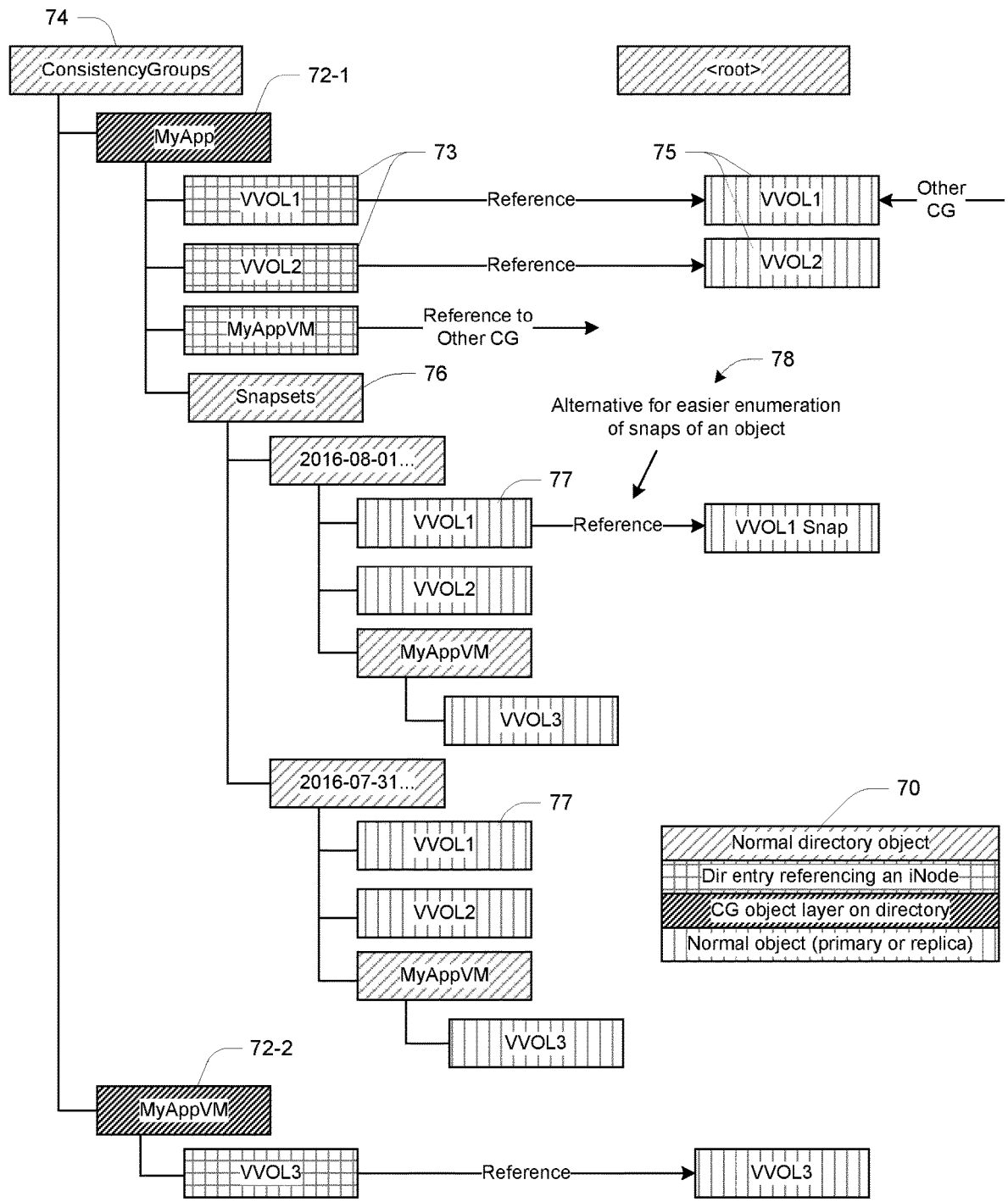
FIGS. 6 and 7 are schematic depictions of example organizations of file systems having native consistency groups.

FIG. 6 illustrates one type of use of consistency groups. FIG. 6 is a graph-type depiction for the filesystem 42, which includes objects of several types identified in a key 70:

Normal directory object (directory), e.g., 74, 76
Directory entry referencing an iNode, e.g., 73
Consistency group (having directory type features), e.g., 72
Normal object (storage object in a file, which may be a primary object or a snap/replica), e.g., vVol1, vVol2, e.g., 75

In the organization of FIG. 6, two consistency groups (CGs) 72 are shown (MyApp 72-1 and MyAppVM 72-2). They are sub-objects of a ConsistencyGroups directory 74. The MyApp CG 72-1 contains references 73 to two primary vVol objects vVol1 and vVol2 (75), with vVol1 being a shared object also referenced by another CG as indicated at far right. Snapshots of the CG 72-1 are stored in a Snapsets sub-directory 76. Snapsets shown as 2016-08-01 and 2016-07-31 (representing date stamps) are shown. As indicated at 78, a snapshot object (e.g., vVol1 77) may include a reference to its own separate snapshot, making it easier to enumerate the snaps of an object. Thus in this embodiment, the CGs 72 are groupings of vVols, both primary and snapshots.

The following are functions/routines that may be implemented by the filesystem 42 in connection with consistency groups 72:

CreateObject(cgName, OBJECT_TYPE_CG)
DeleteObject(cgName)
CreateReferenceLink(cgName, objectName, targetObjectName)
DeleteReferenceLink(cgName, objectName)
CreateReplica(cgName, snapsetName)
EnumerateObjects(cgName)
EnumerateSnapsets(cgName)

The reference link is a reference entry similar to a so-called "hardlink" used in regular filesystems. When two shared objects are linked by a hardlink, then any update to either object is visible on both objects, and an object can only be deleted when all its hardlinks have been deleted. With the consistency group structure, an object may not be deleted even if its hardlinks have been deleted. Links are discussed in more detail below.

Figure 7:
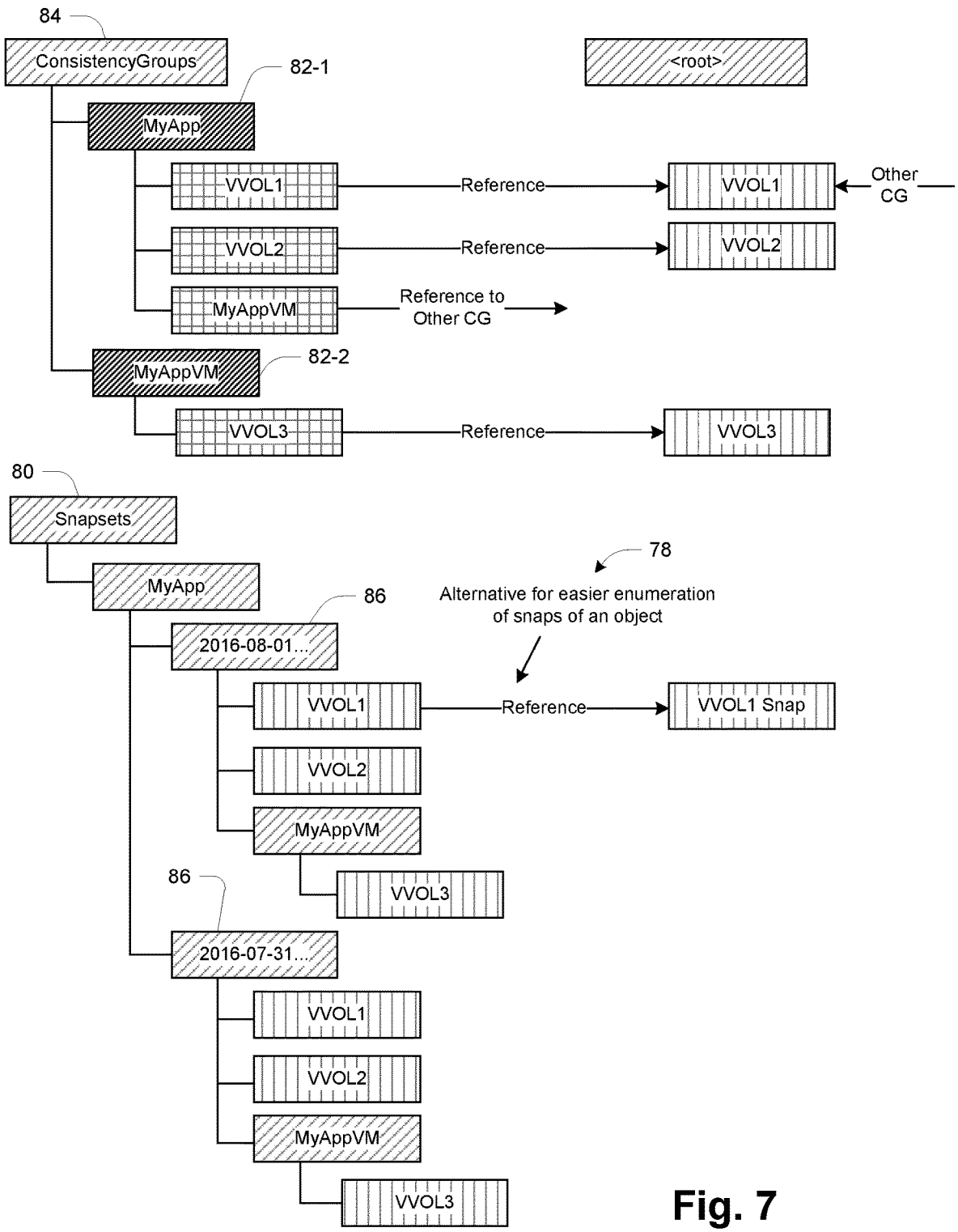

FIG. 7 shows an alternative arrangement that may be employed, which places the snapsets under snapsets directory 80 separate from the CGs 82 in a CG tree under a ConsistencyGroups directory 84. This arrangement allows for deleting consistency groups 82 even if all their snapsets 86 have not been deleted, a feature that may be desirable in certain applications.

Figure 8:
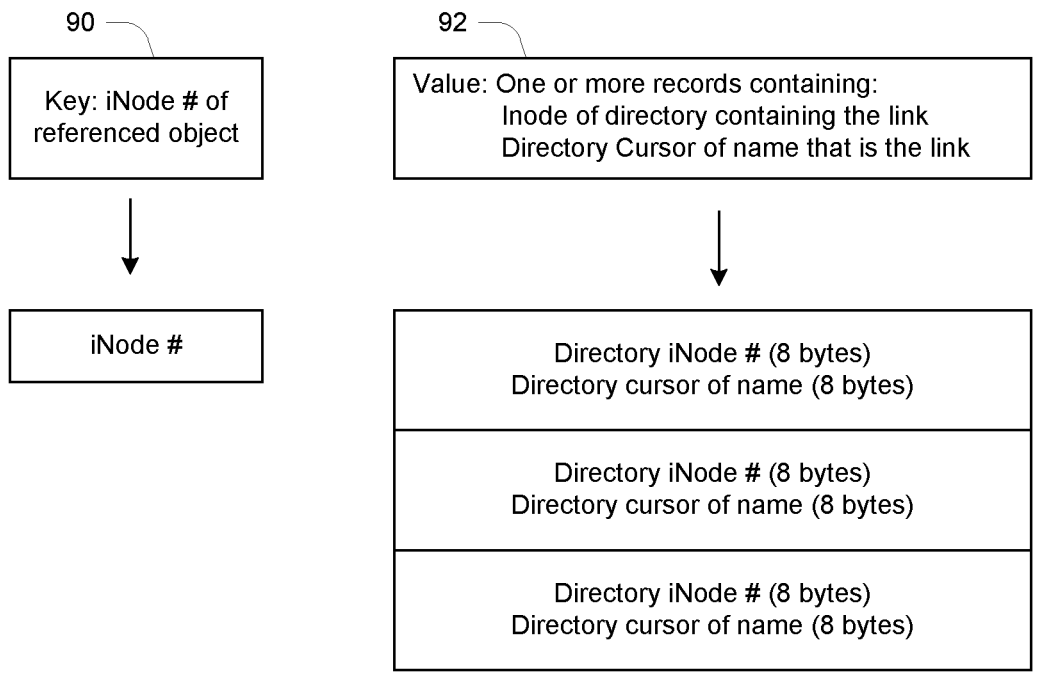
FIG. 8 is a schematic diagram of a links database.

FIG. 8 shows structure of a links database that may be used to identify which objects refer to other objects within the filesystem 42. It is a key-value data store in which an object identifier 90 (iNode #) can be used to look up values 92 which are records identifying locations of the object, each containing (1) the iNode of a directory containing a link to the object, and (2) a directory "cursor" of the name that is the link. Here "cursor" refers to a hash of the file name plus additional bits to help reduce variability.

Figure 9:
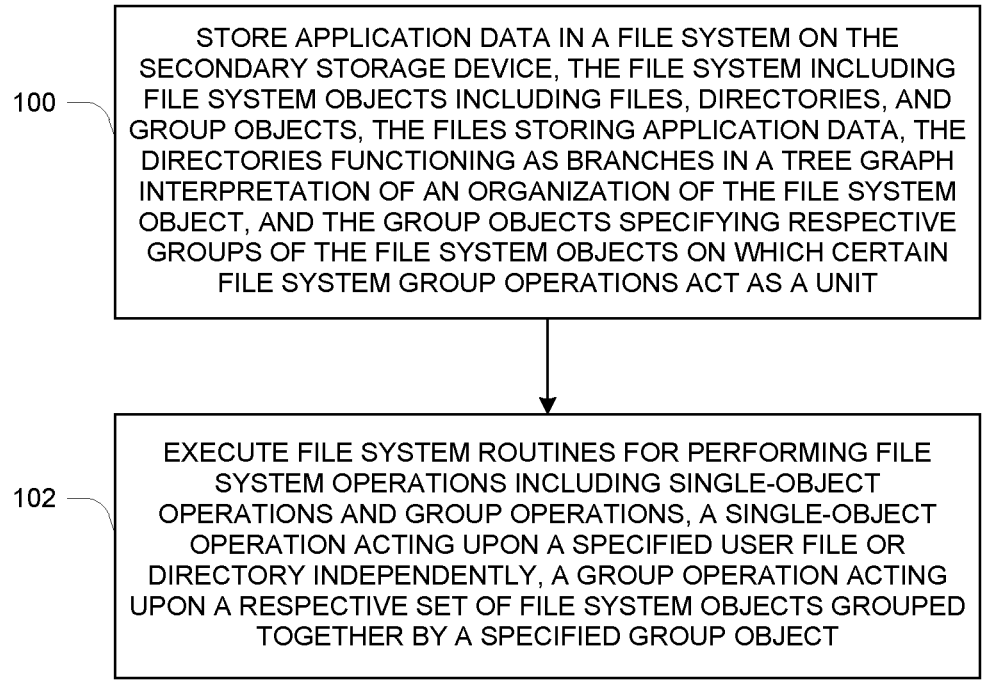
FIG. 9 is a flow diagram of filesystem operation at a high level.

FIG. 9 illustrates pertinent aspects of operation of a filesystem (e.g., filesystem 42) at a high level.

At 100, application data is stored in the filesystem on a secondary storage device. The filesystem includes filesystem objects including files, directories, and group objects (e.g., consistency groups 72, 82). The files store application data, and the directories function as branches in a tree graph interpretation of an organization of the filesystem object. The group objects specify respective groups of the filesystem objects on which certain filesystem group operations act as a unit.

At 102, filesystem routines are executed for performing filesystem operations including single-object operations and group operations. A single-object operation acts upon a specified user file or directory independently, which a group operation acts upon a respective set of filesystem objects grouped together by a specified group object. Examples of single-object operations are regular file operations such as creating a file, opening it, writing to it, reading from it, closing it, and deleting it. An example group operation is taking a snapshot of a set of separate volumes that may all be used by the same application, such as a database application for example.

While various embodiments of the invention have been particularly shown and described, it will be understood by those skilled in the art that various changes in form and details may be made therein without departing from the scope of the invention as defined by the appended claims.

What is claimed is:

1. A computer having a secondary storage device for persistent storage of application data generated by a data storage application, the secondary storage device having a filesystem thereon, the filesystem including:

filesystem objects including files, directories, and consistency group objects, the files storing the application data, the directories functioning as branches in a tree graph interpretation of an organization of the filesystem objects, and the consistency group objects specifying respective groups of the filesystem objects on which certain filesystem group operations act; and filesystem routines for performing filesystem operations including single-object operations and consistency group operations, a single-object operation acting upon a specified user file or directory independently, a consistency group operation acting upon a respective consistency group of filesystem objects grouped together by a specified consistency group object, wherein the consistency group operations include group snapshot operations each specifying a respective consistency group object and each including (i) first transactionally suspending IO to all the objects of the respective consistency group and (ii) then creating a snapset object containing a single point in time snapshot of all the objects of the respective consistency group, the group snapshot operations being carried out by the file system without special programming of the data storage application.

2. A method of operating a computer having a secondary storage device for persistent storage of application data generated by a data storage application, comprising:

storing the application data in a filesystem on the secondary storage device, the filesystem including filesystem objects including files, directories, and consistency group objects, the files storing the application data, the directories functioning as branches in a tree graph interpretation of an organization of the filesystem objects, and the consistency group objects specifying respective groups of the filesystem objects on which certain filesystem group operations act; and executing filesystem routines for performing filesystem operations including single-object operations and consistency group operations, a single-object operation acting upon a specified user file or directory independently, a consistency group operation acting upon a respective consistency group of filesystem objects grouped together by a specified consistency group object, wherein the consistency group operations include group snapshot operations each specifying a respective consistency group object and each including (i) first transactionally suspending IO to all the objects of the respective consistency group and (ii) then creating a snapset object containing a single point in time snapshot of all the objects of the respective consistency group, the group snapshot operations being carried out by the file system without special programming of the data storage application.

3. The computer of claim 1, having a block subsystem including block components and filesystem components of the filesystem, the block subsystem being responsible for providing block-oriented storage resources including logical volumes to applications of the computer using the secondary storage device, the block components defining and operating upon logical storage objects stored as the files in the filesystem, the filesystem providing basic operations including reading and writing as well as higher-level operations including the group snapshot operations.

4. The computer of claim 1, wherein the filesystem includes components at three functional layers including a namespace layer, a mapper layer, and a cache layer, the namespace layer performing higher-level functions including managing the filesystem objects as single logical extents, the mapper layer performing more detailed underlying operations including maintaining an indirect-block tree of inodes as filesystem metadata identifying underlying storage blocks for the filesystem objects, the cache layer being a transaction layer enabling the namespace layer to start transactions and have them completed automatically, and to buffer intermediate results so that either an entire transaction is committed or it is aborted.

5. The computer of claim 1, wherein the group snapshot operation either completes for all filesystem objects of a respective consistency group or does not complete for any filesystem object of the respective consistency group.

6. The computer of claim 5, wherein the consistency group objects are used in connection with storage operations including one or more of replication, rebuilding, or migration.

7. The computer of claim 6, wherein the consistency group objects are used in connection with restoring sets of disks across multiple virtual machines collectively requiring restoration of the same restored image after a disruption.

8. The computer of claim 1, wherein each of the consistency group objects is layered on top of a respective directory and is formed as a super-type of directory that incorporates functionality of underlying directory objects.

9. The computer of claim 1, wherein the consistency group objects are distinct objects each having structure and functionality similar to corresponding structure and functionality of the directories but not utilizing or relying on the directories for the structure and functionality.

10. The computer of claim 1, wherein the consistency group operations performed on the consistency group objects include CreateObject, DeleteObject, CreateReferenceLink, DeleteReferenceLink, CreateReplica, EnumerateObjects, and EnumerateSnapsets, wherein a reference link is a reference entry linking two shared objects such that an update to either object is visible on both objects.

11. The method of claim 2, having a block subsystem including block components and filesystem components of the filesystem, the block subsystem being responsible for providing block-oriented storage resources including logical volumes to applications of the computer using the secondary storage device, the block components defining and operating upon logical storage objects stored as the files in the filesystem, the filesystem providing basic operations including reading and writing as well as higher-level operations including the group snapshot operations.

12. The method of claim 2, wherein the filesystem includes components at three functional layers including a namespace layer, a mapper layer, and a cache layer, the namespace layer performing higher-level functions including managing filesystem objects as single logical extents, the mapper layer performing more detailed underlying operations including maintaining an indirect-block tree of inodes as filesystem metadata identifying underlying storage blocks for the filesystem objects, the cache layer being a transaction layer enabling the namespace layer to start transactions and have them completed automatically, and to buffer intermediate results so that either an entire transaction is committed or it is aborted.

13. The method of claim 2, wherein the group snapshot operation either completes for all filesystem objects of a respective consistency group or does not complete for any filesystem object of the respective consistency group.

14. The method of claim 13, wherein the consistency group objects are used in connection with storage operations including one or more of replication, rebuilding, or migration.

15. The method of claim 14, wherein the consistency group objects are used in connection with restoring sets of disks across multiple virtual machines collectively requiring restoration of the same restored image after a disruption.

16. The method of claim 2, wherein each of the consistency group objects is layered on top of a respective directory and is formed as a super-type of directory that incorporates functionality of underlying directory objects.

17. The method of claim 2, wherein the consistency group objects are distinct objects each having structure and functionality similar to corresponding structure and functionality of the directories but not utilizing or relying on the directories for the structure and functionality.

18. The method of claim 2, wherein the consistency group operations performed on the consistency group objects include CreateObject, DeleteObject, CreateReferenceLink, DeleteReferenceLink, CreateReplica, EnumerateObjects, and EnumerateSnapsets, wherein a reference link is a reference entry linking two shared objects such that an update to either object is visible on both objects.

19. The computer of claim 1, wherein the filesystem objects of each consistency group are distinct filesystem objects independently storing respective distinct portions of the application data.

\* \* \* \* \*